(12) United States Patent
Levie

(10) Patent No.: US 12,176,665 B1
(45) Date of Patent: Dec. 24, 2024

(54) ADAPTER COUPLER FOR HYBRIDIZATION OF POWER CONNECTORS

(71) Applicant: Jordan Levie Inc., Brooklyn, NY (US)

(72) Inventor: Jordan Levie, Brooklyn, NY (US)

( * ) Notice: Subject to any disclaimer, the term of this patent is extended or adjusted under 35 U.S.C. 154(b) by 433 days.

(21) Appl. No.: 17/677,050

(22) Filed: Feb. 22, 2022

Related U.S. Application Data

(60) Provisional application No. 63/161,249, filed on Mar. 15, 2021.

(51) Int. Cl.
| | |
|---|---|
| *H01R 31/06* | (2006.01) |
| *H01R 13/622* | (2006.01) |
| *H01R 43/18* | (2006.01) |
| *H01R 43/26* | (2006.01) |
| *H01R 13/62* | (2006.01) |

(52) U.S. Cl.
CPC ........... *H01R 31/06* (2013.01); *H01R 13/622* (2013.01); *H01R 43/18* (2013.01); *H01R 43/26* (2013.01); *H01R 13/6205* (2013.01)

(58) Field of Classification Search
CPC .. H01R 31/06; H01R 13/622; H01R 13/6205; H01R 43/18; H01R 43/26
See application file for complete search history.

(56) References Cited

U.S. PATENT DOCUMENTS

| | | | | |
|---|---|---|---|---|
| 4,478,474 A | * | 10/1984 | Gallusser | H01R 13/622 439/312 |
| 4,484,790 A | * | 11/1984 | Schildkraut | H01R 13/622 439/312 |
| 4,487,470 A | * | 12/1984 | Knapp | H01R 13/622 439/321 |
| 4,519,661 A | * | 5/1985 | Brush, Sr. | H01R 13/622 439/312 |
| 4,552,427 A | * | 11/1985 | Landgreen | H01R 13/622 439/316 |
| 4,648,670 A | * | 3/1987 | Punako | H01R 13/622 74/577 M |
| 7,988,488 B2 | * | 8/2011 | Orlando | H01R 13/622 439/551 |

(Continued)

*Primary Examiner* — Thanh Tam T Le
(74) *Attorney, Agent, or Firm* — Umberg Zipser LLP

(57) ABSTRACT

An adapter coupler for hybridization of power connectors includes a threaded back nut a threaded retaining ring and a scheme for modification of existing incompatible power connectors. The threaded back nut has an outer flange face and is affixed using its internal threading to a power connector. The threaded retaining ring slips over a power connector and back nut interfacing with the back nut flange face and allowing the assembly to be affixed using its internal threading to a magnetic breakaway connector. The modification scheme retrofits the power connector and magnetic breakaway connector with new internal profiles and electrical connections to achieve a unified power connector hybridization. This enables the hybrid connector to be superimposed over a device's inbuilt power connection terminal and provide the benefits of a magnetic breakaway connector where this functionality was previously incompatible. Devices, in particular motion-picture cameras, are thus made to be more efficient in the connection and disconnection of external cabled power sources and therefore faster and more convenient to operate during filming.

8 Claims, 5 Drawing Sheets

(56) References Cited

U.S. PATENT DOCUMENTS

| | | | | |
|---|---|---|---|---|
| 8,303,338 B2* | 11/2012 | Chen | ............... | H01R 9/0518 |
| | | | | 439/578 |
| 8,708,732 B2* | 4/2014 | Toda | ............... | H01R 13/6271 |
| | | | | 439/352 |
| 9,240,636 B2* | 1/2016 | Youtsey | ............... | H01R 13/622 |
| 9,531,120 B2* | 12/2016 | Bates, III | ............... | H01R 43/0207 |
| 9,742,139 B2* | 8/2017 | Small | ............... | B25B 13/481 |
| 10,218,122 B1* | 2/2019 | Rengifo | ............... | H01R 13/639 |
| 10,276,963 B2* | 4/2019 | Powell | ............... | H01R 13/26 |
| 10,658,787 B2* | 5/2020 | An | ............... | H01R 13/5213 |
| 10,658,794 B2* | 5/2020 | Zhang | ............... | H01R 24/40 |
| 10,665,984 B1* | 5/2020 | Lee | ............... | H01R 13/631 |
| 10,734,769 B2* | 8/2020 | Kralik | ............... | H01R 13/631 |
| 10,797,436 B2* | 10/2020 | Ma | ............... | H01R 13/622 |
| 10,916,865 B2* | 2/2021 | Eriksen | ............... | H01R 13/585 |
| 10,985,514 B2* | 4/2021 | Watkins | ............... | H01R 9/0524 |
| 11,404,833 B2* | 8/2022 | Urtz, Jr. | ............... | H01R 13/15 |
| 11,489,300 B2* | 11/2022 | Smith | ............... | H01R 13/622 |

* cited by examiner

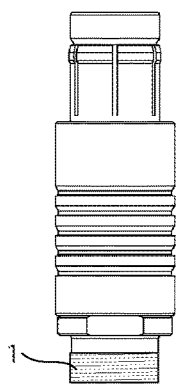
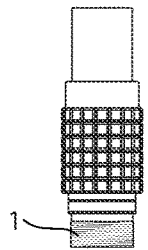
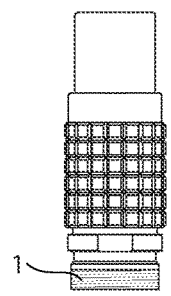
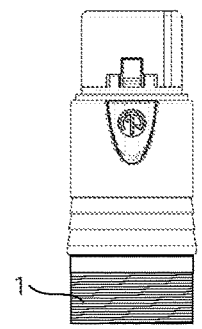
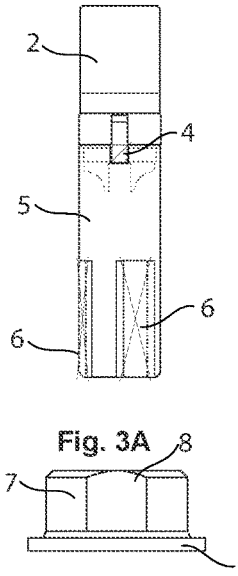
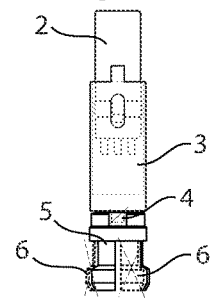
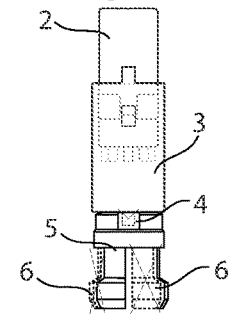
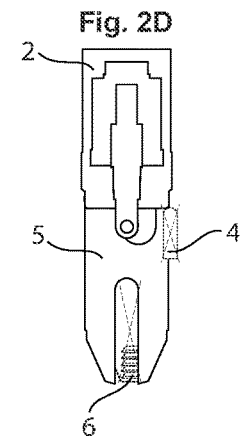
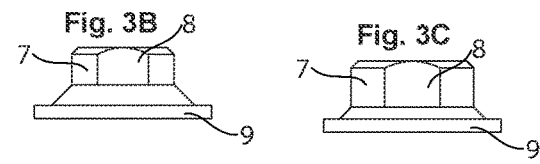
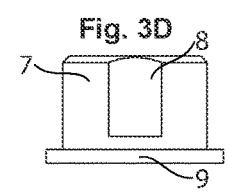
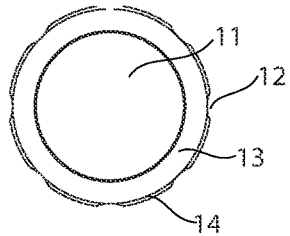
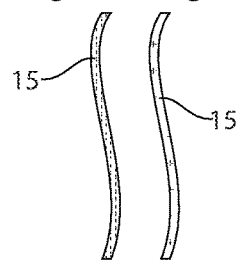
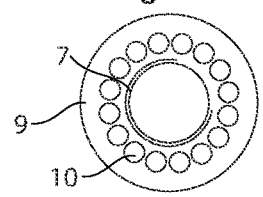
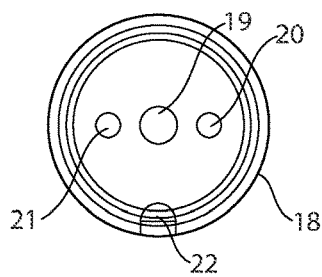
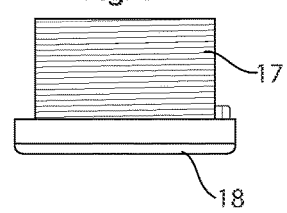
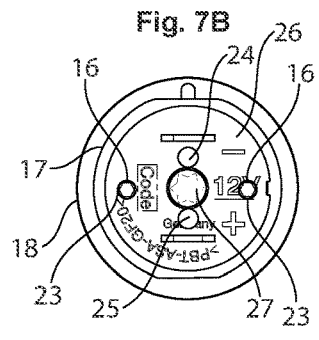

```
┌─────────────────────────────────┐
│ A method of modifying a connector│
│ assembly having a first and a second│
│ connector portion, comprising:  │
└─────────────────────────────────┘
                 ↓
┌─────────────────────────────────┐
│ (a) attaching a threaded back nut│
│ with a flange face to the connector│
│ shell of the first connector,   │
└─────────────────────────────────┘
                 ↓
┌─────────────────────────────────┐
│ (b) removing internal keying from a│
│ cable sleeve or collet on the first│
│ connector portion,              │
└─────────────────────────────────┘
                 ↓
┌─────────────────────────────────┐
│ (c) re-drilling a rear face on the│
│ second connector portion,       │
└─────────────────────────────────┘
                 ↓
┌─────────────────────────────────┐
│ (d) installing a plurality of registration│
│ pins in the rear face,          │
└─────────────────────────────────┘
                 ↓
┌─────────────────────────────────┐
│ (e) optionally reshaping a pivot on a│
│ interface surface on the second │
│ connector portion, and          │
└─────────────────────────────────┘
                 ↓
┌─────────────────────────────────┐
│ (f) coupling a threaded retention ring│
│ to the second connector portion to│
│ thereby allow removable coupling of│
│ the first and second connector  │
│ portions.                       │
└─────────────────────────────────┘
```

*Fig. 12*

```
┌─────────────────────────────────┐
│ A method for hybridization of natively │
│ incompatible first and second   │
│ connectors, comprising:         │
└─────────────────────────────────┘
                │
                ▼
┌─────────────────────────────────┐
│ (a) attaching a threaded back nut │
│ with a flange face to the connector │
│ shell of the first connector,   │
└─────────────────────────────────┘
                │
                ▼
┌─────────────────────────────────┐
│ (b) retrofitting respective internal │
│ structures of first and second  │
│ connectors to enable electric   │
│ coupling of the first and second │
│ connectors when first and second │
│ connectors are mechanically coupled, │
└─────────────────────────────────┘
                │
                ▼
┌─────────────────────────────────┐
│ (c) securing first and second   │
│ connectors using said back nut and an │
│ attached ring with retaining flange at │
│ the second connector to conjoin first │
│ and second connectors.          │
└─────────────────────────────────┘
```

*Fig. 13*

ADAPTER COUPLER FOR HYBRIDIZATION OF POWER CONNECTORS

CROSS-REFERENCE TO RELATED APPLICATIONS

This application claims the benefit of U.S. provisional patent application Ser. No. 63/161,249 filed Mar. 15, 2021 by the present inventor.

TECHNICAL FIELD

This This disclosure relates generally to tools for motion picture filmmaking, and more particularly to improving efficiency of connection and disconnection of external cabled sources that provide power to a camera device.

BACKGROUND

Most motion picture cameras receive their primary power supply from a swappable onboard battery pack. Depending on the camera's manufacturer, this can be loaded internally, mounted externally, or attached to a camera rig and then plugged in to the camera's inbuilt power port. Because of their small size (in weight and capacity) these onboard batteries do not provide lengthy runtime for the camera system. It is essential that a camera stays reliably powered while filming is in progress. If camera power is interrupted during filming, recorded footage would be lost and time would be lost waiting for devices to reboot.

To ensure that the camera power is not interrupted during filming, the camera operator will often employ dual redundant power systems-powering the camera from either a large high-capacity cabled battery pack or an AC/DC inverter power module in addition to the power from the small onboard battery.

Cameras that are mounted on a dolly or a tripod and are less mobile are often continually plugged in to dual power sources as this can provide redundancy as well as a much longer operating time. When a camera is handheld or on a Steadicam system for filming that is in motion, it is not feasible for the camera to remain plugged in to the cabled power supply because the camera needs to be freely mobile. Therefore, in order to extend the life of the onboard battery, the camera operator will often plug the camera into the cabled power supply in between filming when the camera is on standby and the scene is restaged.

This procedure is complicated by the fact that motion picture sets are often very fast paced, with pressure on the camera operators to get the camera up and running, ready to film a moment's notice. Often, the camera is on standby for only a few brief moments, during which time the camera operators may need to accomplish many tasks, such as changing lenses or filters, or adjusting the camera rigging. Within this context, plugging the camera into a secondary cabled external power source with a traditional power connector can be too inefficient. Even the few seconds it takes to insert and secure a traditional power connector into the camera's inbuilt power port can take too long in this fast-paced and pressure-filled setting.

Another problem with traditional power connectors for cameras is the risk that the camera can be accidentally repositioned while still attached to the externally cabled power source. If this happens, it is possible that camera's inbuilt power connector is tugged upon and broken by the power cable itself. This risk is especially high when the camera is being used on a Steadicam rig. When using Steadicam, the camera is placed on a stationary stand in-between filming, where it is often plugged in to the external cabled power source. If the Steadicam operator (or handheld camera operator) picks up the camera before unplugging a traditional external power cable the power connectors may be damaged.

Despite these frustrations related to existing power connectors for camera systems, no manufacturer has developed one connector that can easily and efficiently connect and release the power connection between the camera and the externally cabled power source. Other types of power connector systems are available which employ magnetic quick breakaway and quick reattachment, but these systems are previously not included as inbuilt camera components nor are they compatible with current camera power connectors.

An adapter coupler is required to hybridize available magnetic power connectors onto industry standard compatible camera power connectors. There are various connectors on the market that allow secure power connection from a cabled power source to a device and there are other separate connector systems available that allow efficient magnetic breakaway and reattachment of a cabled power sources, however no motion picture devices include inbuilt ports offering these improvements and no products exist allowing hybridazation of power connectors to magnetic breakaway connectors.

An industry standard "electrical contact plug" in Swiss patent CH340537A (1957), is an example of a class of circular power connector systems ubiquitous in the filmmaking industry and other industries. This style of connector system creates a secure integral power connection resistant to disconnection especially in the axial direction specifically under forces applied directly to the cable of the cabled power source unless a specific locking mechanism of the connector body is disengaged. As stated, this manner of connection is inferior and detrimental to efficiency and device safety when operating camera and other devices undergoing frequent movement and repositioning.

Another industry standard "Housing for electrical devices" in U.S. Pat. No. 4,145,566A (1979), is an example of a class of power connector systems also ubiquitous in the filmmaking industry and other industries. This style of connector system creates a secure integral power connection resistant to disconnection especially in the axial direction specifically under forces applied directly to the cable of the cabled power source unless a specific locking member of the connector body is depressed. As stated, this manner of connection is inferior and detrimental to efficiency and device safety when operating cameras and other devices undergoing frequent movement and repositioning.

The example of "Magnetic Surface Contacts" in U.S. Pat. No. 10,938,147B2 (2021) is a proposed type of power connection which allows rapid magnetic breakaway and reattachment of a cabled external power source. This may be commonly found as an inbuilt component of Apple Macintosh personal laptop computers. This example is implemented only as an inbuilt device port with a matching cabled supply plug and is not a system available for hybridization onto other common industry standard ports nor is it adaptable to other power connectors not within its original manufacturer's connector ecosystem.

The example of "Method and Device for Producing an Electrical Connection of Sub-assembles and Modules" in U.S. Pat. No. 7,344,380B2 (2008) is a proposed type of power connection which allows rapid magnetic breakaway and reattachment of a cabled external power source. Although this device provides said benefits of added connection/disconnection efficiency and electrical port safety it is intended for installation in a manner incompatible with other proposed industry standard power connectors and circular connectors for example being affixed into a flat panel.

SUMMARY

A novel adapter coupler allows an improved power connector system to be hybridized from the existing traditional power connectors and a magnetic breakaway connection system for most types of power ports on camera devices, thereby creating a power connection that can easily and efficiently connect and release. This modification creates a new interface for mounting camera power connectors to power connectors which use existing magnetic breakaway technology.

Accordingly, several advantages are provided by this improved power connection system, which may include (but are not limited to): a more efficient way to plug and unplug camera devices into cabled external power sources; reduced risk of moving the camera device in a deleterious manner due to unintentionally remaining plugged into an external cabled power source, thereby preventing damage to power connectors; a more streamlined and efficient overall management of camera operation.

BRIEF DESCRIPTION OF DRAWINGS

FIG. 1A through FIG. 7B are exploded views of four embodiments of the complete assembly of the invention.

FIG. 1A is a side view of a Fisher type DC power connector shell, which is a component for one of the embodiments of the invention.

FIG. 1B is a side view of a Lemo 1B type DC power connector shell, which is a component for one of the embodiments of the invention.

FIG. 1C is a side view of a Lemo 2B type DC power connector shell, which is a component for one of the embodiments of the invention.

FIG. 1D is a side view of a XLR type DC power connector shell, which is a component for one of the embodiments of the invention.

FIG. 2A is a side view of a Fisher type contacts insert, cable sleeve and cable collet, which is a sub-assembly of one of the embodiments of the invention.

FIG. 2B is a side view of a Lemo 1B type contacts insert, cable sleeve and cable collet, which is a sub-assembly of one of the embodiments of the invention.

FIG. 2C is a side view of a Lemo 2B type contacts insert, cable sleeve and cable collet, which is a sub-assembly of one of the embodiments of the invention.

FIG. 2D is a side view of a XLR type contacts insert, cable sleeve and cable collet, which is a sub-assembly of one of the embodiments of the invention.

FIG. 3A is a side view of the back nut for the Fisher type connector embodiment of the invention.

FIG. 3B is a side view of the back nut for the Lemo 1B type connector embodiment of the invention.

FIG. 3C is a side view of the back nut for the Lemo 2B type connector embodiment of the invention.

FIG. 3D is a side view of the back nut for the XLR type connector embodiment of the invention.

FIG. 3E is a rear view of the back nut of all the embodiments.

FIG. 4 is a side view of the retaining ring component.

FIG. 4A is a rear view of the retaining ring component.

FIG. 5A is a side view of ground/negative (V−) Lead Wire.

FIG. 5B is a side view of positive (V+) Lead Wire.

FIG. 6A is a side view of the left rotation locking registration pin.

FIG. 6B is a side view of the right rotation locking registration pin.

FIG. 7 is a side view of a Rosenberger Mag Code Powersystem port housing.

FIG. 7A is a end view of a Rosenberger Mag Code Powersystem port.

FIG. 7B is a rear view of a Rosenberger Mag Code Powersystem port.

FIG. 8 is a side view of a Rosenberger Mag Code Powersystem plug.

FIG. 9 is a side view of a power cable.

FIG. 10 is a DC power source connector.

FIG. 11B is a side view of a complete assembly of the Fisher type embodiment of the invention.

FIG. 11C is a side view of a complete assembly of the Lemo 1B embodiment of the invention.

FIG. 11D is a side view of a complete assembly of the XLR embodiment of the invention.

FIG. 12 and FIG. 13 illustrate flow charts for the claimed subject matter.

DRAWINGS—REFERENCE NUMERALS

Figure 8:
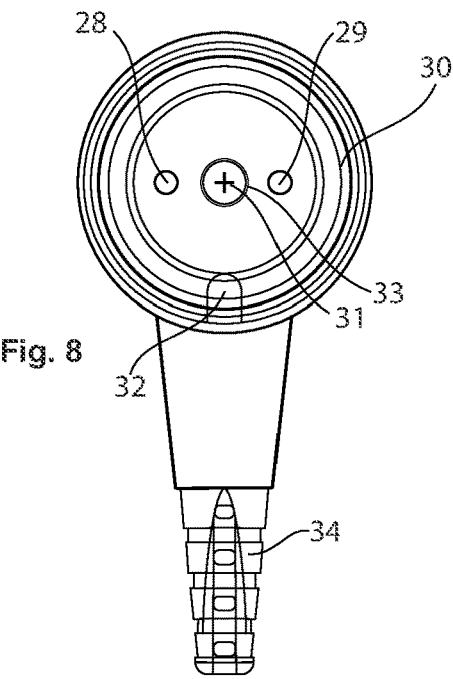
FIG. 8 through 10 is an exploded view of a complete external power supply cable assembly.

Reference will hereinafter be made to the drawings in which similar elements in different drawings bear the same reference numerals, listed below. Where reference is made in any one or more of the accompanying drawings to steps and/or features, which have the same reference numerals, those steps and/or features have, for the purposes of this description, the same function(s) or operator(s), unless the contrary intention is apparent.

1 Camera Connector Male Threading
2 Contact pin carrier
3 cable sleeve
4 removed/defeated internal connector key
5 cable collet
6 removed collet tooth
7 Back nut female threading
8 Flat for wrench tightening
9 Rear interface flange
10 Rotation lock registration hole detent
11 Retaining ring center hole
12 Knurl for hand tightening
13 Retaining flange for back nut
14 Retaining ring internal female threading
15 flexible high amp load stranded wire
16 Registration pin threading
17 Mag Code port male threading
18 Magnetic interface surface (female)
19 Magnetic interface center pivot
20 Positive (V+) terminal
21 Negative (V−) terminal
22 Mag Code alignment divot
23 Hole for rotation locking registration pin
24 Negative (V−) lead wire hole
25 Positive (V+) lead wire hole
26 Rosenberger Mag Code Powersystem port rear face 27 Rosenberger Mag Code Powersystem port rear face attachment screw
28 Positive (V+) Terminal
29 Ground (V−) Terminal
30 Magnetic interface surface (male)
31 Mag Code Plug assembly screw and interface center pivot/screw
32 Mag Code alignment key
33 Spacer washer (for 24 v-standard embodiments)
34 Rubber strain relief boot
35 Two conductor DC power cable
36 Cable strain relief boot

DETAILED DESCRIPTION

Illustrative implementations of an adapter coupler for hybridization of power connectors are described in some detail below. A person skilled in the art will appreciate that in the development of an actual implementation of the disclosed adapter coupler for hybridization of power connectors, numerous implementation-specific decisions could be made to achieve a developer's specific goals, such as compliance with system-related and business-related constraints, which will vary from one implementation to another. It will be appreciated that such a development effort might be complex and time-consuming but would nevertheless be a routine undertaking for those of ordinary skill in the art having the benefit of this disclosure. Moreover, the disclosed adapter coupler for hybridization of power connectors can be used or readily adapted for other application-specific uses.

FIG. 1A, FIG. 1B, FIG. 1C and FIG. 1D are perspective views of Camera DC Power Connectors which interface with a cinema camera to supply primary and/or secondary power voltage. A rear section 1 has male threading to interface with a matching back nut.

FIG. 2A, FIG. 2B, FIG. 2C and FIG. 2D are perspective views of the internal sub-assemblies of camera DC power connectors which allow power lead wires to be connected to power contacts in the insert carrier 2. Internal alignment keying 4 on the insert carrier 2 or cable sleeve 3 must be defeated and/or removed to allow for additional twisting and rotation of the internal wiring when the back nut flange 9 is rotated against the rear of the Mag Code port FIG. 7. Cable collet teeth 6 which normally secure a power cable into a power connector must be removed to allow for additional clearance and rotation of the internal wiring.

FIG. 3A, FIG. 3B, FIG. 3C, FIG. 3D and FIG. 3E are perspective views of the connector back nuts which have internal female threading 7 matching that of the male threading 1 on the camera connector embodiments. Flat faces 8 on the sides of the back nuts allow for them to be wrench tightened to the matching connector. A rear interface flange 9 of the back nut is consistent across all embodiments and allows for the back nut and affixed connector assembly to be held in place against the Mag Code Port FIG. 7 using the retaining ring FIG. 4. Registration divots/holes are provided in the rear face of the back nut to allow the back nut and affixed connector assembly to lock in a fixed rotational position when tightened against the Mag Code port.

FIG. 4 and FIG. 4A are perspective views of the retaining ring. The retaining ring center hole 11 is wide enough to fit over all camera connector embodiments. Knurled exterior profile 12 is provided to aid in hand tightening the retaining ring internal female threading 14 onto the matching male thread of the Mag Code port 17. When fully tightened the inner retaining ring flange face is brought into alignment against the back nut interface flange sandwiching it against the Mag Code Port rear face and affixing the entire camera connector assembly and back nut to the Mag Code Port FIG. 7.

FIG. 5A and FIG. 5B are perspective side views of the positive and negative power supply wires. These are made from flexible, high amp load stranded wire 15 and deliver power supply voltage between the camera connector contacts and the Mag Code Powersystem contacts 20, 21.

FIG. 6A and FIG. 6B are perspective side views of the left and right rotation locking pins. These have external male threading 16 to interface with holes in the Mag Code power port and are spaced apart to fit into the registration holes 10 in the rear of the back nut. When fitted in place these pins prevent the back nut FIG. 3 from rotating against the Mag Code port FIG. 7.

FIG. 7, FIG. 7A and FIG. 7B show perspective views of the Mag Code Powersystem port. The main body of this port has external male threading 17 which matches the female threading of the retaining ring 14. On the rear face 26 of the Mag Code port there are two holes 23 drilled to accept the male threading of the rotation locking pins 16. Also on the rear face 26 of the Mag Code port is a hole drilled 24 allowing the negative power supply wire to pass through. Also on the rear face 26 of the Mag Code port is a hole drilled 25 allowing the positive power supply wire to pass through. There is an assembly screw 27 in the center of the rear face 26. The front side of the Mag Code port provides a male magnetic interface surface 18 which bonds to the matching Mag Code magnetic plug FIG. 8 when brought into close proximity. The front face of the Mag Code port has a center pivot point 19 which is modified according to the voltage standard that is required for the connector embodiment. 12v-standard embodiments are left with the original protruding convex male pivot point. 24v-standard embodiments are milled to create a depressed concave female pivot. A concave divot 22 on the lower hemisphere of the front face of the Mag Code port fits into the matching divot on the Mag Code port 32 and only allows the magnetic interface surface 18 to come into correct specific alignment with the matching face 30. A positive voltage terminal 20 is connected continuously internally to the positive lead wire FIG. 5B and the positive pins on the camera connector contact carrier 2. A negative voltage terminal 21 is connected continuously internally to the negative lead wire FIG. 5A and the negative pins on the camera connector contact carrier 2.

FIG. 8 is a perspective front view of a Mag Code Powersystem plug. It has a male magnetic interface surface 30 which bonds to the matching Mag Code magnetic port FIG. 7 when brought into close proximity. The front face of the Mag Code plug has a center screw 31 which is secured to hold together the plug assembly and also act as a pivot point which is modified according to the voltage standard that is required for the connector embodiment. 12v-standard embodiments are left with the original flat-head screw creating a concave female pivot point. On 24v-standard embodiments a plastic washer/spacer 33 is inserted and a button-head hex screw replaces the original assembly screw to create a protruding convex male pivot. A convex key 32 on the lower hemisphere of the front face of the Mag Code plug fits into the matching divot on the Mag Code port 22 and only allows the magnetic interface surface to come into correct specific alignment with the matching face. A positive voltage terminal 28 is connected continuously internally to the power cable 35 positive conductor and the positive pin contact on the power source connector FIG. 10. A negative voltage terminal 29 is connected continuously internally to the power cable 35 negative conductor and the negative pin contact on the power source connector FIG. 10. A rubber strain-relief boot 34 is inserted over the power source cable FIG. 9 and into the bottom of the Mag Code Plug.

Figure 9:
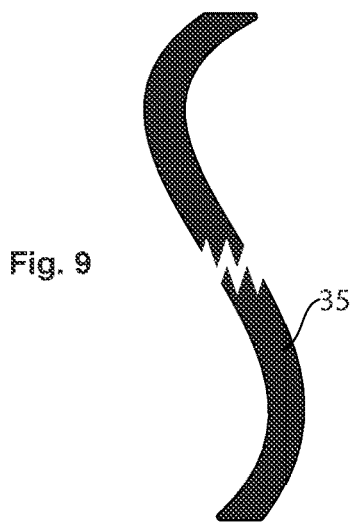

FIG. 9 is a perspective view of a power cable. A multi-conductor high-amp-load cable 35 is used to provide negative and positive voltage between the Mag Code plug power contacts 28, 29 and the power source connector FIG. 10.

Figure 10:
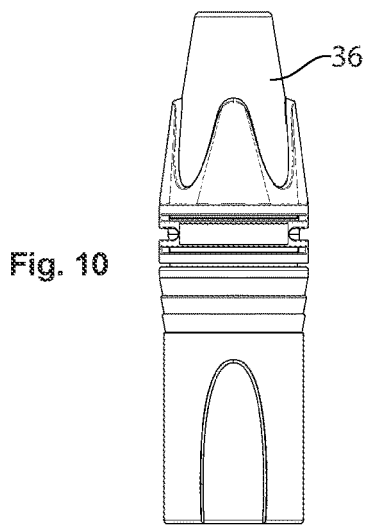
Figure 11A:
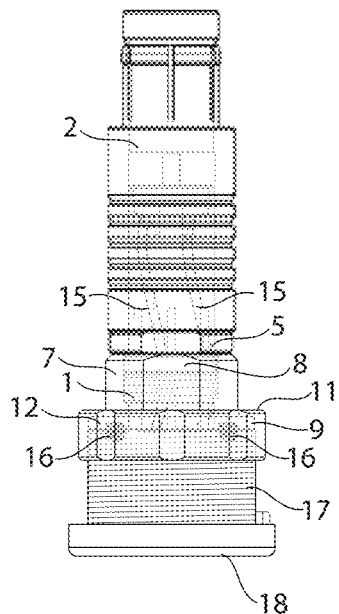
FIG. 11A through FIG. 11D are complete assembly views of four embodiments of the complete invention.
Figure 11B:
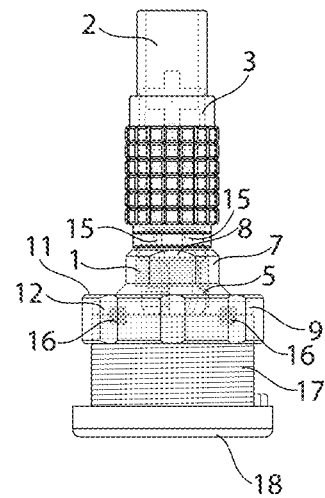
Figure 11C:
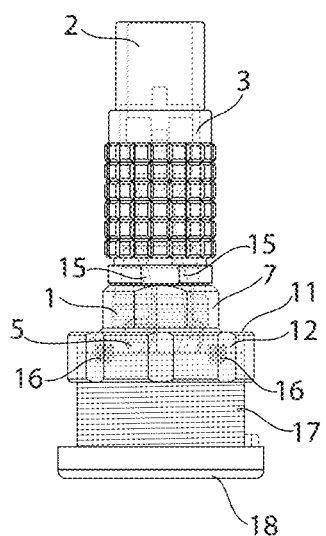
Figure 11D:
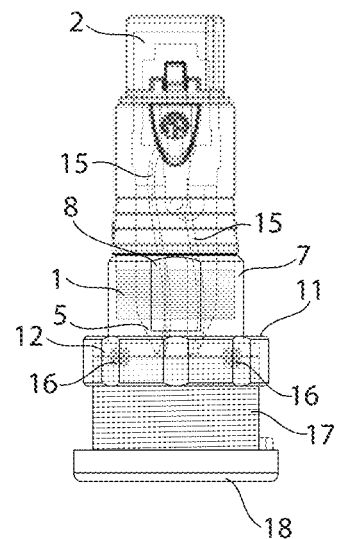

FIG. 10 is a perspective side view of an XLR-type power source connector. This connector receives the power cable 35 via a strain-relief boot 36 and plugs into the power source. This provides voltage into the system.

FIG. 11A through FIG. 11D are complete assembly views of four embodiments of the complete invention.

FIG. 12 and FIG. 13 illustrate flow charts for the claimed subject matter.

Operation

In operation the user implements the camera power connector embodiments (FIGS. 1A-1D) as well as the Rosenberger Mag Code magnetic coupling Powersystem (FIGS. 7 and 8) as normally prescribed by their respective manufacturers. The hybridization of the Mag Code power port (FIG. 7) onto the rear connection of the camera DC power connector embodiments (FIGS. 1A-1D) requires specific novel couplers and modifications. Implementation of the final hybridized full assembly has four effects which increase camera usability and workflow efficiency.

(1) The camera power connector (embodiment selected to match the cinema camera in use) and Mag Code Power Port full assembly (FIGS. 1A-7) is inserted into the camera's power input port and left in place during camera operation. This effectively superimposes a vertically oriented magnetic breakaway power connection where initially there was an inbuilt horizontally oriented locking connection. Tugging force thereafter applied to the magnetic breakaway connection will have significantly lower risk of damaging the inbuilt camera DC power input port due to lower separation force and lower-torque separation vector.

(2) When magnetic interface surface 30 of the Mag Code Powersystem plug is brought into close proximity to the interface surface 18 of camera DC power connector/Mag Code Power Port full assembly (FIGS. 1A-7) the two components are automatically drawn together and automatically oriented into the correct mating alignment. This operation brings the positive and negative power terminals 20, 21, 28, 29 into contact and passes voltage from the power source through into the camera system. The automated functions of this operation create a successful power connection much more rapidly and with less user force required. Voltage can thus be supplied to the camera with better rapidity and repeatability creating a more efficient workflow and extending the camera's built-in/on-board battery life.

(3) Modifications to the magnetic interface center pivot points 19, 31 are made according to the voltage standard of the cinema camera and power source being implemented by the user. "24 v-standard" camera DC power connector/Mag Code Power Ports (full assemblies) have a female/concave magnetic interface center pivot. "12 v-standard" camera DC power connector/Mag Code Power Ports (full assemblies) have a male/convex magnetic interface center pivot. "24 v-standard" Mag Code power plugs have a male/convex magnetic interface center pivot. "24 v-standard" Mag Code power plugs have a female/concave magnetic interface center pivot. This voltage-specific male/female architecture disallows "24 v-standard" Mag Code power plugs to be successfully mated with "12 v-standard" camera DC power connector/Mag Code Power Ports (full assemblies) thus protecting the user from unintentionally damaging cameras or other film equipment by providing too-high voltages.

(4) The power cable 35 and XLR power source connector (FIG. 10) extend from the terminus of the Mag Code power plug replicating the user's standard expectation for camera power delivery cables thus fitting into established workflows. The XLR power connector (FIG. 10) is the expected standard and is fitted into the power output port of the user's battery or power supply. The generous length of the power cable 35 allows for flexibility in placement of the power source in relation to the cinema camera.

The hybridization of the Mag Code power port (FIG. 7) onto the rear connection of the camera DC power connector embodiments (FIGS. 1A-1D) falls outside either of these product's native assembly procedures and requires a novel set of custom components (FIGS. 3A-3D and 4) and thirteen operations to complete manufacture.

(1) The internal components of the camera DC power connector (FIGS. 1A-1D) must be modified. The contact pin carrier 2 and/or the cable sleeve 3 (depending on embodiment) must have their internal keying 4 removed or defeated so that the cable collet can revolve freely within the connector housing.

(2) In modifying the DC power connector embodiments one or two teeth 6 (depending on embodiment) of the cable collet 5 must be removed so that power feed wires 15 have adequate clearance to pass through the back of the camera DC power connector into the rear of the Mag Code Powersystem port (FIG. 7) and through the power lead wire holes 24, 25.

(3) The novel connector back nut (FIGS. 3A-3D) which has been designed to match its specific camera DC power connector embodiment (FIGS. 1A-1D) is selected and threaded onto the connector rear threading 1 and affixed in place using thread locking adhesive.

(4) The rear face 26 of the Rosenberger Mag Code Powersystem port (FIG. 7) must be disassembled and modified. The attachment screw 27 is removed and the internal components of the Powersystem port are pulled out. Following a precise novel positioning schematic, two holes 23 of a specific size are drilled to accept the left and right rotation locking pins 16. Following a precise novel positioning schematic, two holes 24, 25 of a specific size are drilled to accept allow the pass-through of the positive and negative lead wires 15.

(5) The right and left rotation locking pins (FIGS. 6A and 6B) must be threaded into holes 23 to a specific depth.

(6) The internal components of the Powersystem port must be modified. The original inbuilt power output pegs are cut away from the inbuilt internal flexible power connections and discarded. New positive and negative power lead wires 15 of a specific pre-determined length (dependent on embodiment selected) are soldered in their place. The newly attached power lead wires 15 are pushed though the inside of the Powersystem port rear face 26 via the pre-drilled holes 24, 25.

(7) Following these previous modifications, the hybridization of Powersystem port (FIG. 7) with the camera DC power connector (FIGS. 1A-1D) must be completed. The negative power supply wire (FIG. 5A) is fed though the cable collet 5, the cable sleeve 3 and is then soldered to the negative pin(s) of the contact pin carrier 2.

(8) The positive power supply wire (FIG. 5B) is fed though the cable collet 5, the cable sleeve 3 and is then soldered to the positive pin(s) of the contact pin carrier 2.

(9) The back nut (FIGS. 3A-3D) which is affixed to the camera DC power connector (FIGS. 1A-1D) is fed over the assembled contact pin carrier 2, the cable sleeve 3, the cable collet 5 and the power supply wires (FIGS. 5A and 5B) and is seated into place following the specifications of that embodiment's original manufacturer.

(10) The back nut rear interface flange 9 is manually pressed against the Powersystem port rear face 26 so that the rotation locking pins (FIGS. 6A and 6B) are in alignment with the matching rotation lock registration holes 10.

(11) The novel retaining ring (FIG. 4) is fed over the top of the camera DC power connector (FIGS. 1A-1D) and back nut (FIGS. 3A-3D) subassembly so that the ring's female threading 14 meshes with the Powersystem port's external male threading 17. The Retaining ring is screwed down fully so that the retaining flange 13 sandwiches the rear interface flange 9 against the Powersystem port rear face 26 thus affixing these components (FIGS. 1A through 7) into one self-contained assembly.

(12) The Magnetic interface center pivot 19 of the Mag Code Powersystem port (FIG. 7) must be modified depending on the voltage-standard of the embodiment being manufactured. Rosenberger Powersystem ports are initially built with a male/convex plastic center pivot point. For "24 v-standard" embodiments the proud pivot mound is drilled away using a round-headed bit of specific size to a specific depth creating a female/concave profile in the face of the magnetic coupling surface. For "12 v-standard" embodiments the inbuilt original male/convex center pivot point is left unmolested.

(13) The Magnetic interface center pivot 31 of the Mag Code Powersystem plug (FIG. 8) must be modified depending on the voltage-standard of the embodiment being manufactured. Rosenberger Powersystem plugs are initially shipped with a flat head housing assembly screw 31 which creates a female/concave center pivot point in the magnetic interface surface 30. For "24 v-standard" embodiments the flat head screw is discarded and the Powersystem plug housing is assembled with a plastic spacer washer 33 of a specific thickness and a round-headed button-cap hex screw which creates a male/convex center pivot point. For "12 v-standard" embodiments the original flat head assembly screw 31 is utilized as intended by the original manufacturer.

Thus, the scope of the embodiments should be determined by the appended claims and their legal equivalents, rather than by the examples given.

I claim:

1. A method of modifying a connector assembly having a first and an second connector portion, comprising (a) attaching a threaded back nut to a connector shell of the first connector portion, (b) removing internal keying from a cable sleeve or collet on the first connector portion, (c) re-drilling a rear face on the second connector portion, (d) installing a plurality of registration pins in the rear face, and (e) optionally reshaping a pivot on a interface surface on the second connector portion, and (f) coupling a threaded retention ring to the second connector portion to thereby allow removable coupling of the first and second connector portions.

2. The method of claim 1 wherein said back nut has an internal threading, planar faces to mate with said retention ring, and axial divots to mate with said registration pins.

3. The method of claim 1 wherein said retention ring has internal threading, a planar face that mates with said back nut, and a central hole to allow for clearance of said back nut.

4. The method of claim 1 wherein step (b) further comprises removing of a male profile of the cable sleeve or collet, and a severing of at least one collet tooth of the cable collet.

5. The method of claim 1 wherein step (c) further comprises drilling the rear surface of the second connector portion with a first pattern of holes for pass-through of electrical wires, and a second pattern of holes for installation of registration pins.

6. The method of claim 1 wherein step (e) further comprises modifying an existing male convex profile of the second connector portion to convert the male convex profile into a specific female concave divot.

7. The method of claim 1 wherein the modified connector assembly enables hybridizing otherwise incompatible connectors.

8. A method for hybridization of natively incompatible first and second connectors, comprising:
   (a) attaching a threaded back nut with a flange face to the connector shell of the first connector;
   wherein step (a) comprises replacing an original back nut with the threaded back nut;
   (b) retrofitting respective internal structures of first and second connectors to enable electric coupling of the first and second connectors when first and second connectors are mechanically conjoined;
   wherein step (b) comprises removing of original internal keying of the first connector, replacing original electrical interfaces of the second connector, adding a plurality of registration pins to the second connector, and optionally reshaping a central pivot of an interface surface of the second connector; and
   (c) securing first and second connectors using said back nut and an attached ring with retaining flange at the second connector to conjoin first and second connectors;
   wherein said retaining ring further comprises a clearance hole fitting over said back nut and interfacing with said back nut flange and threading to interface with specific connectors.

* * * * *